(12) United States Patent
Seeger et al.

(10) Patent No.: US 10,214,660 B2
(45) Date of Patent: Feb. 26, 2019

(54) TWO-COMPONENT COATING COMPOSITIONS AND COATINGS PRODUCED THEREFROM FOR IMPROVING EROSION RESISTANCE

(71) Applicant: BASF Coatings GmbH, Muenster (DE)

(72) Inventors: Dirk Seeger, Oldenburg (DE); Harald Mueller, Hude/Wuesting (DE); Andreas Meyerjuergens, Oldenburg (DE); Martin Kaune, Oldenburg (DE)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 15/548,612

(22) PCT Filed: Jan. 14, 2016

(86) PCT No.: PCT/EP2016/050654
§ 371 (c)(1),
(2) Date: Aug. 3, 2017

(87) PCT Pub. No.: WO2016/128166
PCT Pub. Date: Aug. 18, 2016

(65) Prior Publication Data
US 2018/0002566 A1    Jan. 4, 2018

(30) Foreign Application Priority Data

Feb. 10, 2015 (EP) .................................. 15154441

(51) Int. Cl.
| | | |
|---|---|---|
| *C09D 169/00* | (2006.01) | |
| *C09D 175/02* | (2006.01) | |
| *B05D 1/02* | (2006.01) | |
| *C09D 175/06* | (2006.01) | |
| *C08G 18/62* | (2006.01) | |
| *C09D 175/04* | (2006.01) | |
| *C08G 18/40* | (2006.01) | |
| *C08G 18/44* | (2006.01) | |
| *C08K 3/34* | (2006.01) | |
| *C08K 9/06* | (2006.01) | |

(52) U.S. Cl.
CPC ............. *C09D 175/06* (2013.01); *B05D 1/02* (2013.01); *C08G 18/4063* (2013.01); *C08G 18/44* (2013.01); *C08G 18/6229* (2013.01); *C09D 169/00* (2013.01); *C09D 175/04* (2013.01); *C08K 3/34* (2013.01); *C08K 9/06* (2013.01); *F05B 2230/90* (2013.01); *F05B 2260/95* (2013.01); *F05B 2280/6011* (2013.01)

(58) Field of Classification Search
CPC .............................. C09D 169/00; C08K 3/34
See application file for complete search history.

(56) References Cited

U.S. PATENT DOCUMENTS

| 2008/0114133 | A1 | 5/2008 | Wamprecht et al. |
| 2009/0247711 | A1* | 10/2009 | Wamprecht ........ C08G 18/4063 525/450 |
| 2012/0093657 | A1 | 4/2012 | Kallesøe et al. |
| 2013/0210997 | A1 | 8/2013 | Kaune et al. |

FOREIGN PATENT DOCUMENTS

| EP | 1 923 414 A2 | 5/2008 |
| WO | WO 2010/122157 A1 | 10/2010 |
| WO | WO 2012/032113 A1 | 3/2012 |

OTHER PUBLICATIONS

International Search Report dated Mar. 17, 2016 in PCT/EP2016/050654.
U.S. Appl. No. 15/523,024, filed Apr. 28, 2017, US 2017-0313830 A1, Dirk Seeger, et al.
U.S. Appl. No. 15/322,601, filed Dec. 28, 2016, US 2017-0152398 A1, Dieter Hohnholz, et al.
International Search Report and Written Opinion dated Mar. 17, 2016 in corresponding PCT/EP2016/050654 (with English translation).

* cited by examiner

*Primary Examiner* — Vu A Nguyen
(74) *Attorney, Agent, or Firm* — Oblon, McClelland, Maier & Neustadt, L.L.P.

(57) ABSTRACT

A two-component coating composition contains (1) a paint base component comprising (A) at least one polycarbonate diol, (B) at least one hydroxyl-containing acrylate resin, polyester resin and/or polyester acrylate resin having a hydroxyl number of 75 to 500 mg KOH/g, and (C) at least one filler modified with at least one organosilane, and (2) a hardener component comprising (D) at least one organic polyisocyanate, where the coating composition has a viscosity of 50 to 2000 mPa·s at a shear stress of 1000 l/s and a temperature of 23° C. and a proportion of organic solvents of 100 to 350 g/L.

15 Claims, No Drawings

TWO-COMPONENT COATING COMPOSITIONS AND COATINGS PRODUCED THEREFROM FOR IMPROVING EROSION RESISTANCE

The present invention relates to two-component coating compositions and to coatings produced from them. The present invention also relates to a method for producing these coatings, and to the use of the coating composition for producing coatings. The present invention relates not least to the use of the coating compositions for improving erosion resistance.

PRIOR ART

In various areas of application there is a requirement for coatings which satisfy exacting mechanical requirements. Examples here include surfaces of objects that in terms of the ambient conditions are exposed to high speeds in conjunction with exposure to erosive substances, such as solids or liquids. Erosive exposure is experienced in principle, therefore, by objects which, firstly, themselves are moved, and, secondly, by objects exposed to the influence of erosive substances. Particularly noteworthy are rotor blades of wind turbines or helicopters and ship's screws, air and land vehicles (such as aircraft, rail vehicles, automobiles, for example), and ships.

Fundamentally, erosion can be brought about by liquid or solid substances which are present themselves or dispersely or in solution in another gaseous or liquid medium (for example, air or water) and which are moved by that medium (for example, airborne sand, rain and/or hail). When these substances impinge on objects or their surfaces, they exert an erosive force on them. Examples of this are the erosion due to rain or airborne sand on rotor blades or in the region of the slats on aircraft. The erosive influences are particularly strong in the region of edges of the objects in question.

In general terms the possibility exists of controlling wear protection, more particularly the erosion resistance, of objects by means of coatings on the surfaces of the objects. Important factors in obtaining effective erosion resistance are known to include a closely matched balance between flexibility or elasticity of the coating, on the one hand, and the hardness of the coating, on the other. Excessive hardness and/or inadequate elasticity tend to be detrimental to effective erosion resistance.

One possibility for increasing erosion resistance is to increase the film thickness of coatings. In many applications, however, such as in aircraft construction or rotor blade construction of wind turbines, for example, this is undesirable, for reasons of weight.

Furthermore, resins with aromatic resin constituents, such as epoxy resins, for example, can be used in the coating compositions on which the coatings are based. On account of the aromatic moieties, however, the resulting coatings, while affording high wear resistance, possess a significantly restricted UV stability.

It is possible, furthermore, to use coating compositions comprising resins with which, induced by light or by temperature, high crosslinking densities can be achieved. For example, UV resins (via radical or ionic polymerization) or certain highly reactive polyaddition resins can be used. With these classes of binder it is likewise possible to enhance the wear resistance, but there are limiting factors governing use on large components such as rotor blades or aircraft components. In the case of formulations comprising UV resins, for example, the selection of pigments is limited, since these pigments may have absorption maxima at curing wavelengths, and the film thicknesses are limited in dependence on the level of pigmentation. Moreover, technical challenges arise in terms of oxygen inhibition of the UV initiators. In the case where temperature-induced coating materials (that is, in particular, common one-component paints) are used, a limitation exists in particular with regard to the baking temperatures in relation to equipment sizing in the case of large components.

International patent application WO 2010/122157 discloses erosion-resistant polyurethane coatings which are produced using aliphatic polyester polyols and an isocyanate component, as for example polylactone-modified isocyanate prepolymers or uretdione compounds.

WO 2012/032113 A1 discloses two-component, erosion-resistant coating compositions based on a polyol component and on a polylactone component terminated by isocyanate groups, these compositions being useful in the production of coatings on rotor blades.

Although the coatings produced accordingly have erosion resistance which is already improved, further improvement is desirable particularly in view of current challenges in, for example, the construction of wind turbine rotor blades, especially for high-wind sites (offshore) and high blade speeds during operation, and also in aircraft construction (weight reduction with equal or improved performance).

An additional factor is that many of the standard prior art systems are formulated as coating compositions free of organic solvents, which accordingly have a fundamentally high viscosity and cannot be applied satisfactorily to a substrate, if at all, via spray application methods. Instead, rolling, painting or roller coating application methods are regularly chosen. However, it is specifically through spray application that comparatively simple and efficiently controllable application of coating compositions is possible. For this purpose, however, the corresponding, composition has to have a comparatively low viscosity under the conditions that exist in the course of spray application (high shear stress), in order to be able to be atomized or sprayed appropriately using the corresponding apparatuses.

It should also be noted that such erosion-resistant coating compositions, if they are to be applicable appropriately via spraying techniques, must generally comprise comparatively high proportions of organic solvents. This is because it is only possible in this way for them to have a viscosity within, the necessary range. A correspondingly high proportion of organic solvents is in turn detrimental to the ecological profile of the composition. Such compositions thus have too high a VOC (volatile organic content, i.e. proportion of organic solvents, reported as the amount of organic solvents in grams per liter of composition).

Problem

It was therefore an object of the present invention to eliminate the above-described disadvantages of the prior art. Coating compositions usable for production of erosion-resistant coatings were to be provided, having improved erosion resistance over prior art erosion-resistant coatings. At the same time, the coating compositions were to be easily producible and, in particular, easy to use even in the case of large components such as rotor blades of wind turbines or aircraft. This means, more particularly, that the compositions were to be applicable appropriately to corresponding substrates by spray application and were to be processible without the use of UV initiators and/or high temperatures to give coatings. Nevertheless, the coating compositions were to have an acceptable ecological profile, i.e. especially not too high a proportion of organic solvents.

Solution

Accordingly found has been a solvent-based two-component coating composition comprising
(1) paint base component comprising
   (A) at least one polycarbonate diol,
   (B) at least one hydroxyl-containing acrylate resin, polyester resin and/or polyester acrylate resin having a hydroxyl number of 75 to 500 mg KOH/g, and
   (C) at least one filler modified with at least one organosilane,
and
(2) a hardener component comprising
   (D) at least one organic polyisocyanate,
where the coating composition has a viscosity of 50 to 2000 mPa·s at a shear stress of 1000 l/s and a temperature of 23° C. and a proportion of organic solvents of 100 to 350 g/L.

The new two-component coating composition is subject matter of the present invention and is also referred to below as coating composition of the invention. Preferred embodiments will become apparent from the description hereinafter and from the dependent claims.

The present invent ion also provides a method for producing coatings using the coating composition of the invention, and a coating produced from the coating composition. The invention also provides the use of the coating composition for improving erosion resistance.

The coating composition of the invention is easily processed to coatings. This means, more particularly, that it can be applied to corresponding substrates by spray application and can additionally be cured without the use of high temperatures. The coatings, produced feature excellent erosion resistance. The coating composition and the coatings are therefore ideally suited to substrates which are subject to severe erosive influences, examples being rotor blades or substrates in aircraft construction.

DESCRIPTION OF THE INVENTION

The coating composition of the invention is a two-component coating composition. This means, as is known, that for the purposes of the present invention, component (1) as described below (paint base component), and component (2) as described below (hardener component), are prepared and stored separately from one another and are not combined until shortly before application. The processing time or pot life (in other words, the time within which the coating composition of the invention can be processed at room temperature (15 to 25° C., more particularly 20° C.) without the increase in viscosity, as a result of corresponding crosslinking reactions at room temperature, for example, being so severe that application is no longer possible) is dependent, as is known, on the constituents employed, more particularly on the polycarbonate diols (A), acrylate resins, polyester resins and/or polyester acrylate resins (B), described later on below, and on the polyisocyanates (D). In particular, however, the processing time of the primer is at least 0.1 min up to 10 min, preferably at least 0.5 min up to 5 min. The principal advantage of a two-component coating composition of this kind is that even in the case of large components such as rotor blades of wind turbines or aircraft, easy processing is possible—more particularly, no high temperatures are needed for curing. Following application to a substrate, the coating material of the invention is cured preferably at not more than 80° C., preferably not more than 60° C., especially preferably at from 15 to 60° C.

By curing is meant the process known to the skilled person, in other words the conversion of a coating composition, applied as a film to a substrate, into the ready-to-use state, in other words, therefore, into a state in which the substrate provided with the coating in question can be transported, stored, and put to its intended use. This curing is accomplished more particularly by chemical reaction of reactive functional groups in the components present, which are present as binder constituents in the coating material. Particularly noteworthy, therefore, in the context of the present invention is the reaction of the hydroxyl groups of the polycarbonate (A) and also of the hydroxyl groups of the acrylate resin, polyester resin and/or polyester acrylate resin (B) with the isocyanate groups of the polyisocyanate (D). As a result of these crosslinking reactions and of the parallel evaporation of solvents, a coating film is formed—that is, a cured coating layer (cured coating) is produced. Activation of the reactions is possible by means of thermal energy, although in the present case there is the above-described advantage of high temperatures not being necessary. The term "binder" or "binder constituent" refers herein, in accordance with the relevant DIN EN ISO 4618, to the nonvolatile fraction of a coating material, excluding pigments and fillers. Specific binder constituents are therefore in this sense, as well as components (A) and (B), component (D) too (which may also be referred to as hardener or crosslinking agent), or else typical coatings additives, and also all other nonvolatile constituents, bar the pigments and fillers. For reasons not least of clarity, however, the term "binder" is used principally in relation to those components of the paint base component (1) that are primarily responsible for film forming—that is, more particularly, components (A) and (B). Component (D) is identified primarily, correspondingly, as the hardener or else crosslinking agent.

The two-component coating composition comprises at least one polycarbonate diol (A) in the paint base component (1).

Considered formally, polycarbonate diols are esterification products which may form through reaction of carbonic acid with polyols. In actual practice, as is known, the carbonate structures are introduced by means of phosgene or carbonic diesters under common reaction conditions. The reaction with diols, as for example with 3-methyl-1,5-pentanediol or 1,6-hexanediol, then gives the polycarbonate diols. Besides the carbonate functions joining the starting components, of course, such polycarbonate diols may also, proportionally, include further functional groups such as ester groups or ether groups, depending on the nature and amount of the starting compounds used. The polycarbonate diol is preferably a linear polycarbonate diol. The hydroxyl groups are preferably terminal, in other words arranged at both ends of the preferably linear polycarbonate diol (hydroxyl-terminated polycarbonate diol). Very preferably the compound is an aliphatic polycarbonate diol. The polycarbonate diol therefore preferably contains no aromatic groups, since these groups have a significantly restricted UV resistance.

The polycarbonate diols (A), more particularly the linear, aliphatic polycarbonate diols, preferably possess a hydroxyl number of 50 to 500 mg KOH/g, preferably 100 to 400 mg KOH/g, more particularly 150 to 250 mg KOH/g (measured in accordance with DIN 53240). If reference is made in the context of the present invention to an official standard, this of course means the version of the standard that was current on the filing date, or, if no current version exists at that date, then the last current version.

Since the polycarbonates (A) are diolic components, the OH number and the number-average molecular weight of the component s are dependent on one another, and the stated OH number gives information on the number-average molecular weight. A high number-average molecular weight tends to be accompanied by a low OH number. The number-average molecular weight may vary widely and is situated in the range from, for example, 220 g/mol to 2250 g/mol (measured by means of GPC analysis with THF (+0.1% acetic acid) as eluent (1 ml/min) on a styrene-divinylbenzene column combination, calibration with polystyrene standards).

Suitable polycarbonate diols (A) are available, for example, in the product line Duranol™ Asahi Kasei), Desmophen® from Bayer MaterialScience AG (Leverkusen, Germany) of Eternacoll® (UBE).

The fraction of the polycarbonates (A) is situated preferably in the range from 5 to 50 wt %, more preferably 7.5 to 40 wt %, very preferably 10 to 30 wt %, based in each case on the total weight of the coating composition of the invention.

The two-component coating composition contains, in the paint base component (1), at least one hydroxyl-containing acrylate resin, polyester resin and/or polyester acrylate resin (B) which possesses a hydroxyl number of 75 to 500 mg KOH/g.

As is well known, acrylate resins, also called poly(meth) acrylate resins, are understood to mean polymeric organic compounds containing different acrylate and/or methacrylate monomers, i.e. containing such monomers in reacted form. The term (meth)acrylate in the context of the present invention represents acrylates and/or methacrylates, or those compounds which include acrylates and/or methacrylates or are formed therefrom.

Examples of such acrylate and methacrylate monomers are different alkyl (meth)acrylates and cycloalkyl (meth) acrylates, for example the following compounds known to those skilled in the art: ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and also cyclopentyl acrylate, cyclopentyl methacrylate, Isobornyl acrylate, Isobornyl methacrylate, cyclohexyl acrylate and cyclohexyl methacrylate.

As mentioned above, the acrylate resins (B) contain hydroxyl groups. Accordingly, particular proportions of those acrylate and methacrylate monomers which have hydroxyl groups and hence account for the OH functionality of the polyacrylate resins are preferably incorporated, into the polymer structure. Hydroxyl-containing monomer units used for preparation of polyacrylate resins are hydroxyalkyl (meth)acrylates, for example 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate and especially 4-hydroxybutyl acrylate and/or 4-hydroxybutyl methacrylate.

Further monomer units used for the acrylate resins may be vinylaromatic hydrocarbons such as vinyltoluene, alpha-methylstyrene or especially styrene, amides or nitriles of acrylic acid or methacrylic acid, vinyl esters or vinyl ethers, and especially acrylic acid and/or methacrylic acid.

Acrylate resins (B) of this kind can be prepared in a manner known per se, for example with the aid of the following methods that are customary and known in the field of polymers: continuous or batchwise free-radically initiated copolymerization in bulk, solution, emulsion, miniemulsion or microemulsion under standard pressure or elevated pressure in stirred tanks, autoclaves, tubular reactors, loop reactors or Taylor reactors, at temperatures of, for example, 50 to 200° C.

Polyesters or polyester resins are likewise known. They are polymeric resins prepared by reaction of polyhydric organic polyols and polybasic organic carboxylic acids. These polyols and polycarboxylic acids are linked with one another by esterification, in other words by condensation reactions. Depending on the nature, functionality, and fractions and proportions used of the starting components, the products obtained are, for example, linear or branched. Whereas linear products come about primarily when using difunctional starting components (diols, dicarboxylic acids), the use of alcohols of higher functionality (OH functionality, in other words the number of OH groups per molecule, of more than 2) produces branching, for example. During the preparation process the proportional use of monofunctional components is of course also possible, such as of monocarboxylic acids, for example. It is known that for preparing polyesters it is also possible, instead of or together with the corresponding organic carboxylic acids, to employ the anhydrides of the carboxylic acids, more particularly the anhydrides of the dicarboxylic acids. Likewise possible is preparation through the use of hydroxycarboxylic acids or of the lactones that derive from the hydroxycarboxylic acids by intramolecular esterification.

Examples of diols include ethylene glycol, propylene glycol, butylene glycol, butane-1,4-diol, hexane-1,6-diol, neopentyl glycol and dimethylolcyclohexane. Higher-functionality polyols include trimethylolpropane, glycerol and pentaerythritol. Examples of dicarboxylic acids include o-phthalic acid, isophthalic acid, terephthalic acid, tetrahydrophthalic acid, hexahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids.

The polyester resins (B) can also be prepared in various ways known per se, for example with the aid of the methods of copolymerization that are customary and known in the field of polymers.

Polyester-acrylate resins are correspondingly copolymers (hybrids) comprising structural units of the two above mentioned resin types. They can be prepared by preparation processes known per se, for example by parallel polymerization, taking place in one and the same mixture, of appropriate monomers, graft polymerization and similar known methods.

The hydroxyl number of the acrylate resins, polyester resins and/or polyester-acrylate resins (B) is from 75 to 500 mg KOH/g, preferably 100 to 450 mg KOH/g, more preferably 175 to 400 mg KOH/g, and very preferably from 250 to 350 mg KOH/g.

Corresponding acrylate resins, polyester resins and/or polyester-acrylate resins (B) can be obtained commercially, for example under the Worleecryl or Synthalat trade names.

The fraction of the acrylate resins, polyester resins and/or polyester-acrylate resins (B) is situated preferably in the range from 1 to 25 wt %, more preferably 2 to 20 wt %, very preferably 3 to 15 wt %, based in each case on the total weight of the coating composition of the invention.

The two-component coating composition contains at least one filler (C) modified with at least one organosilane in the paint base component (1).

Useful fillers to be modified (i.e. yet to be modified with organosilanes) in principle include all the fillers known to those skilled in the art in connection with coating compositions, especially inorganic fillers. This should be understood to mean different substances, for example in particulate or pulverulent form, which are used to achieve particular physical properties of coating compositions and are insoluble in the respective application medium. These especially include inorganic fillers, namely carbonate's such as calcium carbonate, dolomite or barium carbonate, sulfates such as calcium sulfate and barium sulfate, and silicates and optionally sheet silicates such as talc, pyrophyllite, mica, kaolin, feldspar, precipitated calcium silicates, aluminum silicates, calcium/aluminum silicates, sodium/aluminum silicates, mullite, wollastonite, nepheline such as nepheline syenite, and silicon dioxide such as quartz and cristobalite. In the context of the present invention, silicon dioxide is assigned to the group of the silicates. Further inorganic fillers are precipitated silicas or fumed silicas, and also metal oxides such as aluminum hydroxide and magnesium hydroxide. Preferred inorganic fillers are silicates.

The filler (C) is a filler modified with organosilanes. The filler to be modified thus serves as the substrate to which the organosilanes are applied. Such a coating of fillers can be effected under conditions known in principle, with physisorption and/or chemisorption of the organosilanes taking place depending on the reaction conditions and/or substrate properties. The coating and/or modifying methods can be effected, for example, in aqueous solution, optionally in the presence of catalysts such as acids or bases, via hydrolysis and subsequent condensation. A conventional example is the hydrolysis of correspondingly hydrolyzable bonds in the organosilane (for example —Si—OGH$_3$ bond) and the subsequent condensation with hydroxyl groups on the filler surface, for example the hydroxyl groups on a silicate surface.

Organosilanes are known to the person skilled in the art. These are components which have been derived from pure silanes (i.e. binary compounds consisting of Si and H) and in which hydrogen has been replaced at least partly by an organic radical and this radical is bonded to the silicon via a carbon atom. In the context of the present invention, compounds are thus referred to as organosilanes when they contain at least one Si—C bond. Useful organic radicals include, for example, pure alkyl radicals or else alkyl radicals in which at least one hydrogen radical has been replaced by a functional group such as an epoxy or amino group. In accordance with commonly used definitions, organosilanes also refer to compounds in which all the Si-bonded hydrogen radicals present in the pure silane have been replaced by other radicals, provided that there is at least one Si—C bond. Standard radicals by which the hydrogen radicals are replaced are, as well as the above-described organic radicals, for example, hydroxyl groups, alkoxy groups or halogens. Such organosilanes may have monomeric, oligomeric or else polymeric character (see below for a definition of oligomeric and polymeric organosilanes).

Preferred organosilanes used for modification can be described by the following general formula (I):

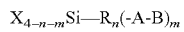  (I)

where

X=OH, halogen, alkoxy, especially methoxy and ethoxy, aryloxy,

R=alkyl, preferably $C_1$ to $C_{12}$-alkyl, phenyl or H,

A=divalent organic radical, especially divalent alkylene radical, preferably $C_1$ to $C_6$-alkylene, especially $C_1$ to $C_3$-alkylene, B=amino, hydroxyl, epoxy, epoxypropyloxy, hydroxyalkyl, acetoxy, isocyanate, acryloyloxy, methacryloyloxy, imidazole, ureido, vinyl group, n, m=0, 1, 2, 3, with n+m≤3, preferably 1≤n+m≤3.

The preferred organosilanes thus have at least one X group, said groups being known to be readily hydrolyzable in aqueous solution, for example, and being linkable to a filler surface having hydroxyl groups, for example a silicate surface, via a subsequent condensation. Preferably, X is a methoxy or ethoxy group.

Through appropriate choice of the substituents, it is thus possible to modify the filler surface in an individualized manner. In each case, the surface of the inorganic fillers is hydrophobized by the addition of the organosilanes. This enables appropriate incorporation of the filler components which have a polarity defined by the inorganic character without the modification but become more hydrophobic with the modification into the organic hydrophobic polymer matrix of the coating system through appropriate physical adsorption and optionally chemical reaction, since they especially have a correspondingly improved compatibility with the polymers. This especially ensures excellent effectiveness of the filler components. This means that the function of the fillers, that of improving the mechanical stability of coatings, is fulfilled very efficiently.

In this case, there may be exclusive modification with silanes bearing alkyl groups (m=0) or modification with functional groups, for example epoxy or amino groups (m>0). It is also possible to use mixtures of different silanes, for example those having only alkyl group functionality (m=0) and those containing at least a proportion of functional groups such as amino groups (m>0).

Another modification option in addition to the use or instead of the use of the organosilanes of the formula (I) is the use of other organosilanes, for example high molecular weight organosilanes. Such organosilanes can also be referred to as oligomeric or polymeric organosilanes in which, for example, two or more of the above mentioned organosilanes of the formula (I) are present in co-condensed form via the hydrolyzable groups present, and only then are applied to the surface of the fillers via further hydrolyzable groups still present. Condensation of monomeric silanes with one another as described can of course, incidentally, for purely statistical reasons alone, also occur during the process for modifying fillers with the organosilanes of the formula (I). This means that, for example, organosilanes of the formula (I) are used, and are able to join onto the filler surface in oligomeric or polymeric form not just in their monomeric starting form but also after condensation with one another. In the context of the present invention, an organosilane is referred to as oligomeric when it is formed from an average of two to five identical or different monomeric organosilane units (i.e. those which contain only one silicon atom). A polymeric organosilane has correspondingly more than 5 units.

Examples include the following organosilanes: propyltrimethoxysilane, propyltriethoxysilane, isobutyltrimethoxysilane, n-octyltrimethoxysilane, i-octyltrimethoxysilane, n-octyltriethoxysilane, n-decyltrimethoxysilane, dodecyltrimethoxysilane, hexadecyltrimethoxysilane, vinyltrimethoxysilane, 3-aminopropyltrimethoxysilane, 3-methacryloyloxytrimethoxysilane, 3-glycidyloxypropyltrimethoxysilane, beta-(3,4-epoxycyclohexyl)ethyltrimethoxysilane, gamma-isocyanatopropyltrimethoxysilane, 1,3-bis(3-glycidoxypropyl)-1,1,3,3-tetramethyldisiloxane, ureidopropyltriethoxysilane, and the homogeneous and heterogeneous oligomers and polymers thereof. Such silanes are available, for example, under the Dynasylan of Geniosil trade names.

In the context of the present invention, preference is given to using silanes containing epoxy or amino groups, especially epoxy- or amino-containing organic radicals bonded to silicon via a carbon atom. By means of these epoxy or amino groups, it is thus possible once again to adjust the polarity profile of the fillers more accurately, in order to make the above-described physical adsorption even more effective. In addition, the fillers (C), in the course of hardening of the coating compositions, can be reacted with, for example, the functional groups of the hydroxyl-containing components (A) and (B) and/or of the polyisocyanates (D), and hence can be incorporated even better into the network that forms. As well as the supporting effect of the physical adsorption already described above, there may thus additionally be chemical incorporation into the matrix.

The particle size of the modified fillers (C) is not a critical parameter per se and is, for example, within the ranges of a few micrometers that are standard for fillers (especially median particle size ($d_{50}$) 0.1 to 100 µm, preferably 1 to 50 µm, measured by means of laser diffraction to ISO 13320: 2009). The amount of the organosilane coatings for such fillers is, for example, between 0.2 and 5 wt %, based on the total weight of the modified filler.

Such fillers (C) can be obtained commercially, for example under the Tremin, Treminex, Tremica or Silbond trade names from HPF—The Mineral Engineers.

The fraction of the fillers (C) is situated preferably in the range from 10 to 50 wt %, more preferably 15 to 40 wt %, very preferably 20 to 30 wt %, based in each case on the total weight of the coating composition of the invention.

The two-component coating composition contains, in the hardener component (2), at least one organic polyisocyanate (D).

Organic polyisocyanates are known to the person skilled in the art. These are aliphatic and aromatic components containing an average of more than one isocyanate group per molecule. It is possible to use the polyisocyanates that are known per se, such as aliphatic and aromatic polyisocyanates, more particularly diisocyanates and their dimers and trimers such as uretdiones and isocyanurates. Examples include hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, and 2,4- or 2,6-diisocyanato-1-methylcyclohexane, the dimers and trimers thereof, and mixtures of these polyisocyanates. It is likewise possible to use the known polyester- or polyether-modified polyisocyanates, i.e. polyisocyanates obtainable by partial reaction of, for example, hydroxy-functional polyesters such as polylactone polymers or hydroxy-functional polyethers with said diisocyanates and/or dimers and/or trimers thereof.

Preference here is given to using the dimers and/or trimers of the stated diisocyanates that are known per se, i.e., in particular, the uretdiones and isocyanurates of the above mentioned diisocyanates, that are known per se and also available commercially.

More particular preference is given to using aliphatic polyisocyanates. Very particularly preferred polyisocyanates are hexamethylene diisocyanate and isophorone diisocyanate and also mixtures thereof, and their various trimers and dimers, such as isocyanurates and uretdiones. Even more preferred is the isocyanurate of hexamethylene diisocyanate.

The isocyanate groups in these components (D) may be free or may be blocked by known blocking agents. The isocyanate groups are preferably unblocked (i.e. free). The coating composition accordingly comprises preferably exclusively components which comprise polyisocyanate groups and which are unblocked, these components being used preferably exclusively in the hardener component.

It will be apparent to the person skilled in the art that, in the preparation of corresponding polyisocyanates, especially in the preparation of the dimers and trimers described, purely for synthesis reasons, the component prepared will not just contain the dimers and trimers but may also contain proportions of residual monomers and/or else proportions of higher molecular weight adducts which can arise, for example, through crosslinking of two isocyanurate rings. In spite of this, such components, which are ultimately a mixture of different molecules obviously having a clear majority of dimers or trimers, are referred, to as dimers and trimers merely for reasons of clarity.

The synthesis-related circumstances described are taken into account, for example, via the isocyanate content of a polyisocyanate component. While, for example, the isocyanurate of hexamethylene diisocyanate theoretically has an isocyanate content of 25%, some commercial products identified as hexamethylene diisocyanate trimers have an isocyanate content of 23%. The real isocyanate content is thus slightly lower than the theoretical content, which suggests minor formation of higher molecular weight adducts.

The polyisocyanate (D) possesses, for example an isocyanate content of 10% to 25%, preferably of 16% to 24%, especially preferably of 20% to 23.5%. In the context of the present invention, the isocyanate content is determined in accordance with DIN EN ISO 11909 by reaction of the respective sample with excess dibutylamine and back-titration of the excess with hydrochloric acid against bromophenol blue.

The stated polyisocyanates are available commercially. It is preferably self-evident that all the polyisocyanates used in the coating composition are present exclusively in the hardener component (2).

The fraction of the at least one polyisocyanate (D) is preferably in the range from 5 to 40 wt %, more preferably 10 to 30 wt %, very preferably 15 to 25 wt %, based in each case on the total weight of the coating composition of the invention.

As further constituents, the coating composition of the invention may comprise any of a wide variety of coatings components that are known to the person skilled in the art.

It is preferred, however, for components (A), (B), (C), and (D) overall to account for a fraction of at least 40 wt %, especially preferably at least 50 wt %, based on the total weight of the coating composition.

The coating composition of the invention may comprise a molecular sieve or a plurality of molecular sieves. Molecular sieve is the designation for natural or synthetic zeolites. As is known, they have a comparatively high internal surface area (about 600 to 700 $m^2/g$) and uniform pore diameters. The result of this is a relatively high adsorbency. Suitable molecular sieves have a pore size of 2 to 10, preferably 3 to 4 angstroms. For example, high-porosity aluminum silicates with a pore size of 3 angstroms may be used. The proportion of the molecular sieves may, for example, be within the range from 1 to 20 wt %, preferably 2 to 15 wt %, more preferably 3 to 10 wt %, based in each case on the total weight of the coating composition of the invention.

The coating composition of the invention may also comprise catalysts for the catalysis of the reaction of hydroxyl groups with isocyanate groups. Based on the total weight of the composition, the coating composition comprises preferably 0.01 to 1 wt % of at least one catalyst. Suitable catalysts are the known metal catalysts such as, for example, tin, molybdenum, zirconium, or zinc catalysts, and also aminic catalysts such as 2-(2-dimethylaminoethoxy)ethanol, for example. Particularly suitable catalysts are tin compounds such as dimethyltin dilaurate or dibutyltin dilaurate, which, like all aforementioned catalysts, catalyze a reaction between the polyisocyanates (D) and the hydroxyl-containing components (A) and (B).

Lastly, the coating material compositions of the invention may also further comprise other constituents different from the components already described. These constituents include, for example, typical coatings additives such as antioxidants, deaerating agents, wetting agents, dispersants, flow control agents, and defoamers, as for example polysiloxane-based defoamers, adhesion promoters, as for example silane-based adhesion promoters, rheological assistants such as thickeners, antisag agents, and thixotropic agents, waxes and wax-like compounds, biocides, matting agents, radical scavengers, light stabilizers, preferably UV absorbers with an absorption maximum below 370 nm and/or sterically hindered amines (HALS), corrosion inhibitors, flame retardants, or polymerization inhibitors, and also soluble dyes, pigments, and further fillers of catalysts. The fraction of such constituents is within the ranges common for them, of 0.1 to 30 wt %, for example, based on the total amount of the coating composition. More particularly, the coating medium composition may contain pigments, for example white pigments, black pigments and/or chromatic pigments such as red pigments. Typical total amounts of such pigments are within the ranges common for them, of 10 to 30 wt %, for example, based on the total amount of the coating composition.

The coating composition is solvent-based, i.e. contains at least one organic solvient in each case.

The term "organic solvent" as used herein corresponds to that of Directive 1999/13/EC of the Council of Mar. 11, 1999 (published in the Official Journal of the European Union on Mar. 29, 1999). According to this, an "organic solvent" is a "volatile organic compound" which is used alone or in combination with other agents, and without undergoing a chemical change, to dissolve raw materials, products or waste materials, or is used as a cleaning agent to dissolve contaminants, or as a dissolver, or as a dispersion medium, or as a viscosity adjuster, or as a surface tension adjuster, or, a plasticizer, or as a preservative. The aforementioned directive defines a "volatile organic compound" as an "organic compound" having at 293.15 K a vapour pressure of 0.01 kPa or more, or having a corresponding volatility under the particular conditions of use. An "organic compound" in turn is a compound containing at least the element carbon and one or more of hydrogen, halogens, oxygen, sulphur, phosphorus, silicon or nitrogen, with the exception of carbon oxides and inorganic carbonates and bicarbonates.

Examples include the following organic solvents: aliphatic and/or aromatic hydrocarbons such as toluene, xylene, solvent naphtha, Solvesso 100, or Hydrosol® (from ARAL), ketones, such as acetone, methyl ethyl ketone or methyl amyl ketone, esters, such as ethyl acetate, butyl acetate, butyl glycol acetate, 3-methoxy-n-butyl acetate, pentyl acetate, methoxypropyl acetate or ethyl ethoxypropionate, ethers such as dipropylene glycol methyl ether, alcohols or hydrochlorocarbons.

However, the amount of organic solvents is chosen such that the coating composition of the invention has a proportion of organic solvents of 100 to 350 g/L, preferably 150 to 325 g/L, especially preferably 200 to 300 g/L.

The proportion of organic solvents can thus be adjusted or determined in a simple manner by taking into account the mass of organic solvents and the volume of the coating composition.

Organic solvents used are, for example, the customary paint solvents. They are essentially chemically inert to the further constituents of a coating composition, and form part of the volatile component of the composition. Particularly suitable organic solvents are aprotic solvents. Esters are very particularly suitable, especially esters of acetic acid, for example $C_{1-4}$-alkyl esters of acetic acid or $C_{1-4}$-alkoxyalkyl esters of acetic acid. Examples, of very particularly suitable esters as solvents are butyl acetate, 1- and 2-methoxypropyl acetate, butyl glycol acetate and 3-methoxy-n-butyl acetate. Further very particularly suitable organic solvents are ketones, for example methyl isobutyl ketone or diketones such as acetylacetone. In addition, the coating composition of the invention may also contain hydrocarbons as solvents, for example aromatic hydrocarbons such as Shellsol A or alkylbenzenes such as xylene and toluene.

The density of the coating composition of the invention is, for example, in the range from 1100 and 1700 g/L, preferably 1200 to 1650 g/L, more preferably from 1300 to 1600 g/L.

The coating composition preferably contains no water or only minor amounts of water (water-free). Especially preferably there is less than 1.0 wt %, preferably less than 0.2 wt %, still more preferably less than 0.01 wt %, of water present, based on the total weight of the coating composition. It is therefore preferably used in the composition only, if at all, as a result of the use of—for example—typical coatings additives, or may be present as a minor impurity.

The solids content of the coating compositions may vary according to the requirements of the individual case, and is of course dependent on the proportion of organic solvents in the composition. Preferably, therefore, the solids content of the coating composition of the invention is 70% to 95%, more preferably 75% to 92.5%, and very preferably 80 to 90 wt %.

By solids content (nonvolatile fraction) is meant that weight fraction which remains as a residue on evaporation under specified conditions. In the present application, the solids content is determined to DIN EN ISO 3251. This is done by evaporating the composition at 130° C. for 60 minutes.

Unless otherwise indicated, this test method may likewise be employed in order to specify or obtain a preliminary determination of, for example, the fraction of various components or constituents of the coating composition, such as a polycarbonate diol (A) or an acrylate resin, polyester resin, and/or polyester acrylate resin (B), for example, as a proportion of the total weight of the composition. It is possible, therefore, to determine the solids of a dispersion of a component that is to be added to the composition. By taking into account the solids content of the dispersion and the amount of the dispersion used in the composition, it is then possible to ascertain or find out the proportion of the component in the overall composition. This determination method may of course also take place if, for example, a constituent has been acquired commercially and is identified by the seller as being solvent-free or water-free. In this case, the solids of the commercial product for use will amount, for example, to approximately 100%.

The coating composition, of the invention has a viscosity of 50 to 2000 mPa·s at a shear stress of 1000 l/s and a temperature of 23° C. Preferred ranges are from 75 to 1800 mPa·s, especially preferably from 200 to 1000 mPa·s (measurement by means of a rotary viscometer, see also DIN 53019).

Accordingly, the coating composition of the invention has a comparatively low viscosity under the high shear stress specified. Therefore, the composition can thus be applied to a substrate very efficiently via spray application, since, as is well known, a composition is subjected to high shear stress when leaving the application nozzle on spray application. In this way, it is possible to form a complete, homogeneous coating film on the substrate by spray application.

The coating composition of the invention preferably has a viscosity of 1000 to 10 000 mPa·s at a shear stress of 1 l/s and a temperature of 23° C., this viscosity at a shear stress of 1 l/s (23° C.) of any coating composition considered being a factor of 4 to 20 higher than the viscosity of this composition at a shear stress of 1000 l/s (23° C.) (measurement by means of a rotary viscometer, see also DIN 53019). Preferred ranges for the viscosity and for the corresponding factor are as follows: 1500 to 7500 mPa·s, factor of 5 to 15, more preferably 2500 to 5000 mPa·s, factor of 6 to 10.

It follows from this that the coating composition of the invention preferably has marked structural viscosity. This means that the composition, during the application process with the high shearing that then exists, has a viscosity which is so low that it can be reasonably atomized (see above), and then, on the other hand, following application to a substrate, with the low shearing that then exists, has a viscosity which is high enough that the coating material is sufficiently sag-resistant and does not run off the substrate or form runs.

In one preferred embodiment, the coating composition of the invention comprises
 (1) in the paint base component
 (A) 5 to 50 wt % of at least one polycarbonate diol,
 (B) 1 to 25 wt % of at least one hydroxyl-containing acrylate resin, polyester resin and/or polyester acrylate resin having a hydroxyl number of 75 to 500 mg KOH/g,
 (C) 10 to 50 wt % of at least one filler modified with at least one organosilane,
 and
 (2) in the hardener component
 (D) 10 to 50 wt % of at least one organic polyisocyanate,
 where the weight figures are each based on the total weight of the coating composition, components (A), (B), (C), and (D) make up a total proportion of at least 40 wt %, based on the total weight of the coating composition, and where the coating composition has a viscosity of 50 to 2000 mPa·s at a shear stress of 1000 l/s and a temperature of 23° C., and a proportion of organic solvents of 100 to 350 g/L.

Within this preferred embodiment, of course, all variants that are advantageous and have been described earlier on above, in terms of the components (A) to (D), for example, may likewise be considered to be advantageous. This applies in respect of the combination of the preferred embodiment with only one or else two, or more of the above-described advantageous variants.

The ratio of the total molar amount of hydroxyl groups in the paint base component to the molar amount of isocyanate groups in the hardener component is preferably from 1.0/0.9 to 1.0/1.5. With particular preference, accordingly, the ratio of the total molar amount of hydroxyl groups in components (A) and (B) of the paint base component to the molar amount of isocyanate groups in the hardener component occupies the stated value.

Of the stated constituents (A), (B), (C) and (D) there is preferably exactly one of each constituent present in the coating composition.

All stated preferred embodiments are taken per se and may be considered as preferred in combination with all other preferred configurations. The preferred embodiments apply not only for the coating composition of the invention, but also for the subject matter described subsequently, as for example a process in which the coating composition is employed.

In the case of a possible particularization to coating compositions comprising preferred components, for example preferred polycarbonate diols (A), the following applies in a specific fractional range. The polycarbonate diols (A) which do not fall within the preferred group may of course also be present in the coating composition. In that case the specific proportional range applies only to the preferred group of polycarbonate diols. It is preferred nonetheless for the total proportion of polycarbonate diols, consisting of polycarbonate diols of the preferred group and polycarbonate diols (A) which are not part of the preferred group, to be subject likewise to the specific proportional range.

In the case of restriction to a proportional range of 10 to 30 wt % and to a preferred group of polycarbonate diols, therefore, this proportional range evidently applies initially only to the preferred group of polycarbonate diols. In that case, however, it would be preferable for there to be likewise from 10 to 30 wt % in total present of all originally encompassed polycarbonate diols (A), consisting of polycarbonate diols from the preferred group and polycarbonate diols (A) which do not form part of the preferred group. If, therefore, 20 wt % of polycarbonate diols of the preferred group are used, not more than 10 wt % of the polycarbonate diols (A) of the nonpreferred group may be used.

In the context of the present invention, the stated principle applies to all stated components of the coating composition and to their fractional ranges.

The present invention also relates to a method for producing the coating composition of the invention. It can be produced using the customary and known mixing methods and mixing assemblies such as stirred tanks, agitator mills, extruders, or compounders. In this context it should be borne in mind that the coating composition of the invention is a two-component composition and that the paint base component and the hardener component are prepared and stored separately from one another and then not combined and mixed until shortly before the application of the coating composition, as described above. Besides the constituents (A), (B) and (C) that are essential to the invention, this paint base component generally comprises any adjuvants and/or coatings additives that may be present. This paint base component is then admixed with the hardener component, which contains constituent (D) that is essential to the invention, shortly before the coating composition is applied to a substrate.

A further subject of the present invention relates to a coating produced from the coating composition of the invention, and also to a method for producing such coatings.

The method for producing a coating comprises the application of the coating composition to a substrate. Application may take place by the customary methods such as spraying, roller coating, rolling, brushing, pouring or by cartridge. But preference is given, to application via spray application methods, such as compressed air spraying, airless spraying, high-speed rotary bell application, airmix methods, electrostatic spray application (ESTA), optionally combined with hot spray application, for example hot air spraying, or else induction mixing. This is because, as already described, the coating composition of the invention has the advantage that, not least because of its specific rheological properties, especially a low viscosity under high shear stress, it can be applied particularly efficiently via spray application methods.

In order to produce a cured coating, the applied coating composition is cured following application. Curing preferably takes place thermally. The coating composition applied, or the coating consisting of the composition, is preferably subjected to temperatures of not more than 80° C., preferably not more than 60° C. Particular preference is given to a temperature range from 15 to 60° C., very particularly from 15 to 50° C.

The period of time needed for complete curing may vary greatly according to the curing temperature selected, and is situated, for example, in the range from 30 minutes to 10 days. Curing may take place, for example, for a time of 30 minutes at 40° C. to 60° C., or else at only 15 to 25° C. for a time of 7 days.

In the course of or prior to the curing, it is also possible to employ customary thermal, curing devices and/or convection methods, examples being tunnel ovens, IR and NIR heat radiators, fans, and blowing tunnels. These devices may also be combined with one another. In that case, a temperature-controlled curing procedure may be assisted by convection.

The coatings may in each case have a dry film thickness of, for example, 100 to 500 μm, preferably from 150 to 400 μm.

The coatings of the invention can be produced on any desired substrates by application to the substrate of a coating composition of the invention. The substrates may be composed of any of a very wide variety of materials and combinations of materials. They consist preferably of metals such as steel or aluminum and also of plastics such as epoxy resin-based plastics, which may have been given glass fiber (GRP), aramid fiber (ARP) and/or carbon fiber (CRP) reinforcement or a natural fiber reinforcement with hemp or sisal, for example, and/or of glass. Preferred substrates are glass fiber-reinforced epoxy resin plastics. The substrates may have any desired shapes and sizes.

An advantage, however, is that very large substrates in particular, such as rotor blades, for example, can be coated without particular technical difficulties. The reason is that the coating composition of the invention can be applied via spray application methods and additionally cured at room temperature (i.e. 15 to 25° C.), meaning that there is no need for explicit supply of heat, in other words thermal energy, as part of a, complex equipment set-up, in order to produce a cured coating. Ultimately, therefore, from a coating produced initially by the application of the coating composition, a cured coating is obtained by simple storage at room temperature.

On account of the very good erosion resistance of the coatings, preferred substrates are those which are particularly subject to rain or sand erosion. Substrates contemplated may be rotor blades, air or land vehicles, ships, edifices, or pipelines. Preferred substrates are rotor blades of wind turbines, helicopters, or ship's screws, and also air vehicles such as airplanes, for example. Suitable substrates more particularly are rotor blades of wind turbines and airplanes.

It follows from the above that a substrate coated with a coating of the invention is also provided by the present invention. It follows equally from the above that the use of the coating composition of the invention and also the use of a coating of the invention for improving the erosion resistance of substrates, more particularly of the substrates specified above, are also provided by the present invention.

It is also possible for a multicoat coating to be produced using a coating composition of the invention. A multicoat coating of this kind is also provided by the present invention. The coating produced from the coating composition is therefore present in a multicoat coating. Preferred multicoat coatings are those, in which a coating of the invention constitutes the topcoat. In this way, one technical effect of the coating of the invention, namely the outstanding erosion resistance, is exploited to its optimum. This means that all of the further coating layers are disposed beneath the coating of the invention, and hence between the substrate and the coating of the invention. A substrate coated with a coating of the invention need not, therefore, be in direct contact with this coating. Disposed in between there may be further coats, an example being at least one surfacer coat known per se.

The present invention is elucidated below by examples.

EXAMPLES

1. Test Methods
1.1 General Remarks

For the laboratory determination of erosion resistance it is in general possible, to use a variety of equipment, with which either the coated substrate for erosion is moved through the erosion medium, or the substrate is fixed and the erosion medium flows around it. A stationary test specimen can be tested, for example, by a high-pressure water jet technique, which is used for water jet cutting, for example. The erosive action is controlled via water pressure, distance from the workpiece, and nozzle size and type. The additional use of sand, corundum or silicon carbide can further enhance the action. Also conceivable is sandblasting or steam blasting, in which case the prevailing pressure, nozzle size, and distance from the workpiece may likewise be used to vary the erosion effect and adapt it to realistic conditions.

In the case of the rain erosion test for moving test specimens, the coated substrate for erosion is attached to a rotor or a disk and is moved, by means of the radial velocity generated, through a curtain of water droplets or mixtures with salt or sand. The most common test scenario at present, which is used in the field of wind energy, for example, works at speeds of 140 m/s and a rain volume of 30 L/h. In the field of the aerospace industry, speeds of up to 220 m/s are tested with a comparable volume of rain. The tests of rain erosion resistance can be effected in accordance with standard ASTM G 73. The setups covered by the standard are individual and can be compared with one another via standards.

Common to the stated testing possibilities is the simulation of realistic velocities, such as peripheral velocities of rotor blades or travel flight velocities of airplanes, with the damage patterns being similar to the damage patterns that occur realistically.

1.2 Test Conditions

In the context of the examples, rain erosion resistance was tested to standard ASTM G 73. The tests were conducted on a rain erosion testbed designed in-house. The test specimens were prepared by combining the respective constituents and homogeneously mixing them in a dissolver (table 1). The viscosity reported in each case was measured with a rotary viscometer (HAAKE RheoStress 600 instrument, Thermo Electron Corporation) at 23° C.

TABLE 1

| Constituent | Parts by weight | | | | | | |
|---|---|---|---|---|---|---|---|
| | I1 | I2 | I3 | C1 | I4 | I5 | C2 |
| Paint base component | | | | | | | |
| Linear aliphatic polycarbonate diol (A) having terminal hydroxyl groups, solvent-free, OH number = 225 | 16.0 | 16.6 | 16.0 | 16.0 | 16.0 | 16.0 | — |
| polyester acrylate resin (B), 75% in methoxypropyl acetate/butyl acetate, OH number = 270 | 8.7 | 9.0 | 8.7 | 8.7 | — | — | — |
| polyester acrylate resin (B), 60% in butyl acetate/methoxypropyl acetate, OH number = 198 | — | — | — | — | 8.7 | 8.7 | 24.9 |
| Polyester/polyether | — | — | — | — | — | — | 4.0 |
| Non-organosilane-modified silicate filler | — | — | — | 24.8 | — | — | — |
| Epoxyorganosilane-modified nepheline syenite (filler (C)) | 30.8 | 32.0 | 24.8 | — | 24.8 | — | — |
| Aminoorganosilane-modified wollastonite (filler (C)) | — | — | — | — | — | 24.8 | 23.2 |
| Molecular sieve | 3.7 | 3.9 | 3.7 | 3.7 | 3.9 | 3.7 | — |
| Additives, optionally partly dissolved in organic solvents | 4.1 | 4.3 | 4.1 | 4.1 | 4.1 | 4.1 | 4.6 |
| Chromatic pigment, white | 15.4 | — | 21.4 | 21.4 | 21.4 | 21.4 | 21.3 |
| Chromatic pigment, red | — | 12.0 | — | — | — | — | — |
| Pigment paste, black | 0.6 | | | | | | 0.5 |
| Pigment paste, yellow | 0.8 | — | 0.1 | 0.1 | 0.1 | 0.1 | 0.7 |
| Flatting agent based on fumed silicas | 3.3 | 2.6 | 3.3 | 3.3 | 3.3 | 3.3 | 3.0 |
| Further organic solvents | 16.6 | 19.6 | 17.9 | 17.9 | 17.9 | 17.9 | 17.8 |
| Total | 100 | 100 | 100 | 100 | 100 | 100 | 100 |
| Hardener component | | | | | | | |
| HDI isocyanurate (D), isocyanate content 23% | 21.3 | 21.3 | 21.3 | 21.3 | 21.3 | 21.3 | 17.8 |
| Methoxypropyl acetate | — | — | — | — | — | — | 4.4 |
| Total | 121.3 | 121.3 | 121.3 | 121.3 | 121.3 | 121.3 | 122.2 |
| Density (kg/L) | 1.5 | 1.52 | 1.53 | 1.48 | 1.5 | 1.51 | 1.49 |
| Proportion of organic solvents (g/L) | 242 | 284 | 264 | 255 | 275 | 276 | 403 |
| Viscosity at a shear stress of 1000 1/s | 500 | 450 | 570 | 400 | 520 | 530 | 600 |
| Viscosity at a shear stress of 1 1/s | 4100 | 4020 | 3820 | 3500 | 3750 | 3800 | 4500 | are spun at defined time intervals (15 minutes) and at defined velocity (140 m/s) through a curtain of droplets. The flow rate applied keeps the rain volume likewise constant (30 L/h). The droplet size of the "rain" applied averages 5-6 mm. The tests are effected at a temperature of 20 to 25° C. The assessment is visual. The erosion resistance corresponds to the time taken for the substrate to first show through.

2. Production of Coating Compositions and Cured Coatings

The paint base components and hardener components of various coating compositions (I=inventive, C=comparative) were prepared by combining the respective constituents and homogeneously mixing them in a dissolver (table 1). The viscosity reported in each case was measured with a rotary viscometer (HAAKE RheoStress 600 instrument, Thermo Electron Corporation) at 23° C.

The respective paint base components were then mixed homogeneously with the respective hardener components in the proportions stated in the table and this mixture was applied directly (airmix application) to an epoxy resin test specimen already coated with a commercial, polyurea-based pore filler. Curing took place by storage over a period of 7 days at 20 to 25° C. The dry film thickness was 300 micrometers.

The multicoat coatings disposed on the substrate were subsequently investigated for rain erosion resistance (table 2).

TABLE 2

|  | I1 | I2 | I3 | V1 | I4 | I5 | C2 |
|---|---|---|---|---|---|---|---|
| Rain erosion test duration | >300 minutes | >300 minutes | >300 minutes | 240 minutes | 270 minutes | 265 minutes | 135 minutes |

It is evident that the multicoat coatings disposed on the substrate and comprising as their topcoat a coating of the invention exhibit a very good erosion resistance. The resistance, moreover, is significantly better than in the case of multicoat coating systems produced without use of a coating composition of the invention.

The systems of the invention thus have the advantage that the underlying compositions are easily processible, more particularly can be applied to a substrate by spray application methods, but nevertheless have a comparatively low content of organic solvents and additionally lead to coatings that are very erosion-resistant.

The invention claimed is:

1. A solvent-based two-component coating composition, comprising
   (1) a paint base component comprising
     (A) at least one polycarbonate diol,
     (B) at least one hydroxyl-containing acrylate resin, polyester resin and/or polyester acrylate resin having a hydroxyl number of 75 to 500 mg KOH/g, and
     (C) at least one filler modified with at least one organosilane, and
   (2) a hardener component comprising
     (D) at least one organic polyisocyanate,
   wherein the coating composition has a viscosity of 50 to 2000 mPa·s at a shear stress of 1000 l/s and a temperature of 23° C. and a proportion of organic solvents of 100 to 350 g/L.

2. The two-component coating composition as claimed in claim 1, wherein said at least one polycarbonate diol (A) has a hydroxyl number of 50 to 500 mg KOH/g.

3. The two-component coating composition as claimed in claim 1, wherein said at least one polycarbonate diol (A) is an aliphatic and linear polycarbonate diol.

4. The two-component coating composition as claimed in claim 1, wherein said at least one acrylate resin, polyester resin and/or polyester acrylate resin (B) has a hydroxyl number of 175 to 400 mg KOH/g.

5. The two-component coating composition as claimed in claim 1, wherein said at least one filler (C) modified with at least one organosilane is selected from the group consisting of the silicates modified with at least one organosilane.

6. The two-component coating composition as claimed in claim 1, wherein said filler (C) modified with at least one organosilane is preparable by modification of an inorganic filler with organosilanes of the formula (I)

$$X_{4-n-m}Si-R_n(-A-B)_m \qquad (I)$$

wherein
X=OH, halogen, alkoxy, aryloxy,
R=alkyl, phenyl or H,
A=divalent organic radical,
B=amino, hydroxyl, epoxy, epoxypropyloxy, hydroxyalkyl, acetoxy, isocyanate, acryloyloxy, methacryloyloxy, imidazole, ureido, vinyl group, and
n, m=0, 1, 2, 3, with n+m≤3.

7. The two-component coating composition as claimed in claim 1, wherein said at least one organic polyisocyanate has an isocyanate content of 16% to 24%.

8. The two-component coating composition as claimed in claim 1, wherein said at least one organic polyisocyanate is an isocyanurate of hexamethylene diisocyanate.

9. The two-component coating composition as claimed in claim 1, which has a proportion of organic solvents of 150 to 300 g/L.

10. The two-component coating composition as claimed in claim 1, which has a viscosity of 1000 to 10 000 mPa·s at a shear stress of 1 l/s and a temperature of 23° C., with the proviso that the viscosity at 1 l/s, 23° C. is a factor of 4 to 20 higher than the viscosity of the coating composition at a shear stress of 1000 l/s, 23° C.

11. A method for producing a coating on a substrate, comprising:
    spraying applying of a coating composition as claimed in claim 1 to a substrate.

12. The method as claimed in claim 11, wherein the coating produced by application is cured at a temperature of not more than 80° C.

13. A coating obtained by a method as claimed in claim 11.

14. A multicoat coating which comprises as topcoat a coating as claimed in claim 13.

15. A method for improving the erosion resistance of a substrate, said method comprising:
    spray applying of a coating composition as claimed in claim 1 to the substrate, to obtain a coated substrate;
    wherein the erosion resistance of the coated substrate is improved compared to the same substrate having no coating.

* * * * *